Nov. 3, 1959     N. D. HELMER ET AL     2,910,793
LICENSE PLATE FRAME
Filed Oct. 22, 1956     2 Sheets-Sheet 1
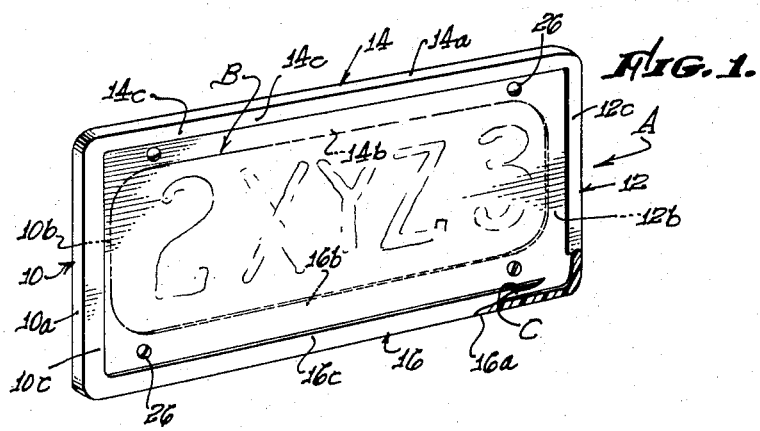
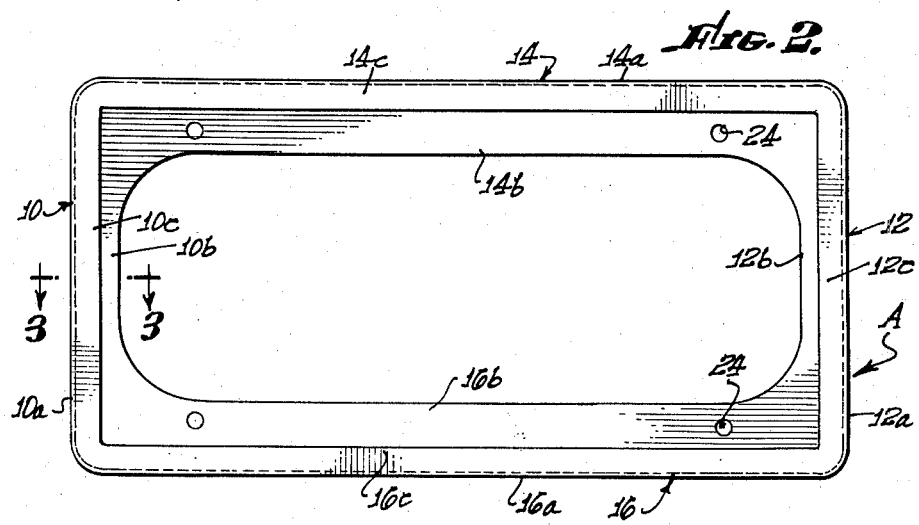
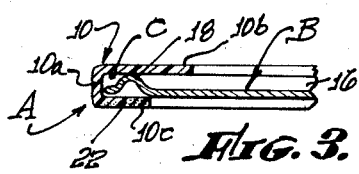
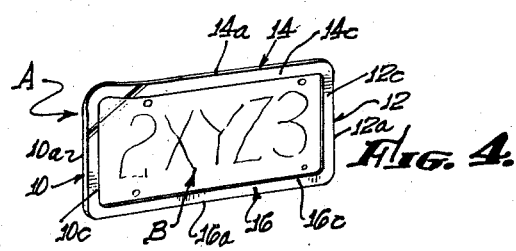
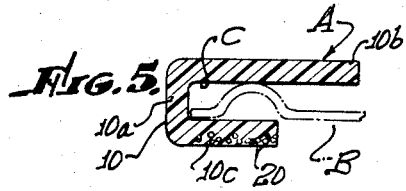
NORMAN D. HELMER,
FRED H. EASTON,
INVENTORS.
BY William C. Babcock
ATTORNEY.

Nov. 3, 1959   N. D. HELMER ET AL   2,910,793
LICENSE PLATE FRAME
Filed Oct. 22, 1956   2 Sheets-Sheet 2
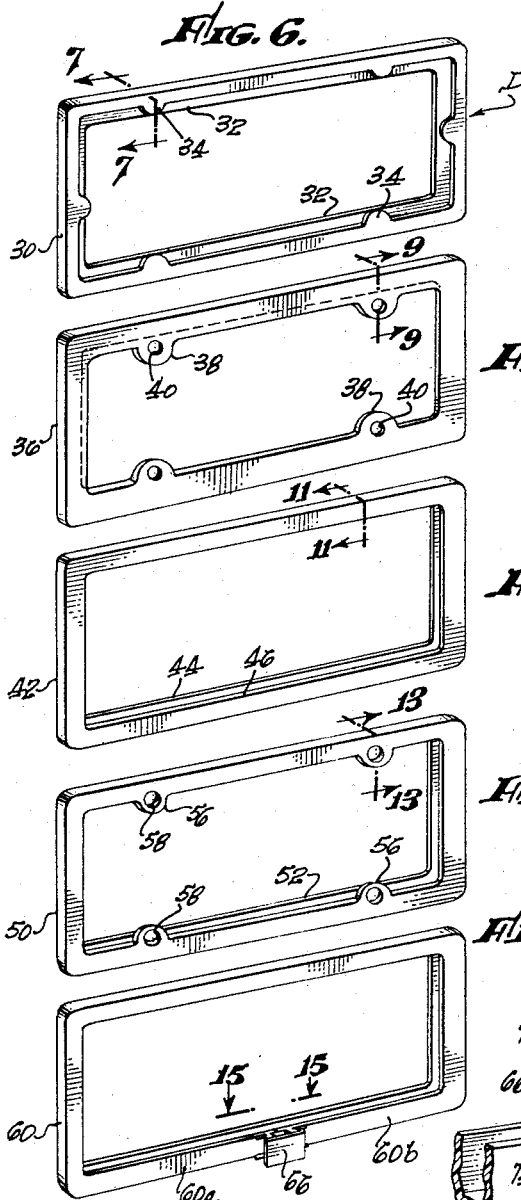
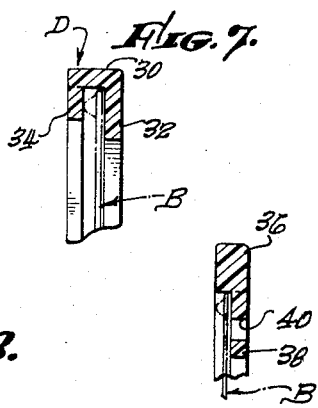
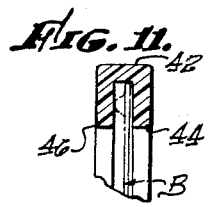
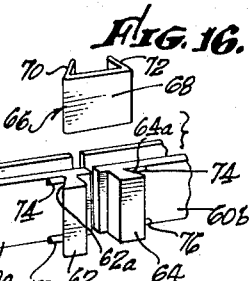
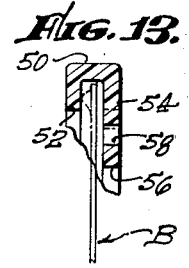
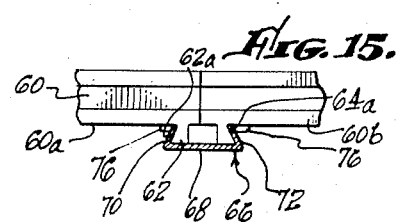
NORMAN D. HELMER,
FRED H. EASTON,
INVENTORS.
By William C. Babcock
ATTORNEY.

United States Patent Office 2,910,793
Patented Nov. 3, 1959

2,910,793

LICENSE PLATE FRAME

Norman D. Helmer, Long Beach, and Fred H. Easton, Los Angeles, Calif; said Easton assignor to said Helmer Application October 22, 1956, Serial No. 617,555

6 Claims. (Cl. 40—209)

The present invention relates generally to automotive accessories, and more particularly to a license plate frame that is not only ornamental, but protects the edge portions of the plate surrounded thereby.

The major objects of the invention are to provide an ornamental license plate frame that envelops the edge portions of the plate encased therein, is easy to mount on or remove from a license plate, has an extremely simple mechanical structure, may be fabricated in a variety of styles and finishes, including but not limited to fluorescent effects, is adapted to conform to the configuration of the plate in the event it becomes bent or otherwise deformed, and can be manufactured at a sufficiently low cost as to encourage its widespread use.

Another object of the invention is to provide a license plate frame which in certain forms thereof can be manufactured from either a resilient material or metal, yet irrespective of the material employed, requires no hand tools in mounting it in a protective position on the license plate.

These and other objects and advantages of a preferred and certain alternate forms of the invention will become apparent from the following description thereof when taken in conjunction with the accompanying drawings, in which:

Figure 1 is a perspective view of the preferred form of the invention, a portion of which is broken away to show the general construction thereof;

Figure 2 is a front elevational view of the device;

Figure 3 is a fragmentary horizontal cross-sectional view of the license plate frame taken on line 3—3 of Figure 2;

Figure 4 is a perspective view of the license plate frame shown mounted on a plate which has been bent or otherwise deformed;

Figure 5 is a fragmentary cross-sectional view of the frame taken on line 3—3 of Figure 2 showing the manner in which a reflective or fluorescent material may be embodied as a part thereof;

Figure 6 is a rear perspective view of a first alternate form of the license plate frame;

Figure 7 is a vertical cross-sectional view of the license plate frame shown in Figure 6 taken on line 7—7 thereof;

Figure 8 is a front perspective view of a second alternate form of the invention;

Figure 9 is a vertical cross-sectional view of the second alternate form of the invention taken on line 9—9 of Figure 8;

Figure 10 is a rear perspective view of a third alternate form of the invention;

Figure 11 is a fragmentary vertical cross-sectional view of the third form of the invention taken on line 11—11 of Figure 10;

Figure 12 is a front perspective view of a fourth alternate form of the invention;

Figure 13 is a fragmentary vertical cross-sectional view of the fourth alternate form of the invention taken on line 13—13 of Figure 12;

Figure 14 is a rear perspective view of a fifth alternate form of the invention;

Figure 15 is a fragmentary plan view of a portion of the fifth alternate form of the invention taken on the line 15—15 of Figure 14; and Figure 16 is a fragmentary perspective view of the locking device embodied in the fifth alternate form of the invention shown in Figure 14 and showing the manner in which the clip is removably disposed in a working position.

Referring to the drawings for the general arrangement of the preferred form of the invention as shown in Figures 1, 2 and 3, it will be seen to include a generally rectangular frame A that is formed of a resilient material such as rubber or one of the numerous commercially available synthetic plastics adapted for this use. Frame A is defined by two parallel, laterally spaced end pieces 10 and 12 that are connected by two cross members 14 and 16. End pieces 10 and 12, as well as cross pieces 14 and 16 serve to define a continuous web that for purposes of identification herein is referred to by the numerals 10a, 12a, 14a and 16a, which web is positioned normal to the faces of the license plate B.

This web is of such configuration and shape as to be slightly larger than the length and width of license plate B around which it extends. To prevent inadvertent displacement of plate B from the frame A, the web portions 10a, 12a, 14a and 16a are provided with flanges 10b, 12b, 14b and 16b, respectively, that project inwardly from the rearward edges thereof, as may best be seen in Figure 1. When license plate B is positioned within the confines of frame A, the rearward surface of the plate abuts against the forward faces of flanges 10b, 12b, 14b and 16b. Webs 10a, 12a, 14a and 16a also have lips 10c, 12c, 14c and 16c projecting inwardly from the edge portions thereof opposite that from which the previously described flanges extend. Web portions 10a, 12a, 14a and 16a cooperate with the flanges and lips extending inwardly therefrom to define a continuously extending confines space C as may best be seen in Figure 3 that envelops the crimped edge portion 18 of the conventional automotive license plate B, as shown in Figure 3.

Due to the resiliency of the material forming the license plate frame A, it is at all times under slight tension and tends to remain on the interior surfaces of the edge portions of the band, whereby the flanges and lips extending therefrom are in contact with the edge portions of the license plate. As mentioned above, the frame A is preferably fabricated from a resilient material, and when this material is of a transparent or translucent nature, the decorative effect achieved thereby can be further augmented by embodying light-reflecting particles of material 20 therein. Also, fluorescent material 22 of the type commonly used for this purpose may be embodied in the license plate frame A, as shown in Figure 3.

The license plate frame above described embodying either light-reflective material 20 or fluorescent material 22 is deformable, and as a result, if the license plate B is struck or inadvertently bent, the frame A also conforms to the bent configuration and is not in any way impaired as a result of this change in shape. When the deformed or bent portion of plate B is straightened out, the license plate frame A likewise straightens out, and is in substantially the same position as before bending or deformation thereof occurred. This is in direct contrast to the presently available metallic license plate frames which, due to the material from which they are fabricated, break, crack or are otherwise permanently damaged, when even the slightest bending of the license plate B occurs.

Although the license plate B in present day use in the individual forty-eight states have been standardized as to length and width, the location of the bolt holes employed in securing them in position on a vehicle have not been standardized. The adaptation of the above-described license plate frame A for use in any particular state is easily accomplished by determining the spacing of the bolt holes in the license plate for that particular state, and then forming bolt holes 24 in the flanges 10b, 12b, 14b and 16b to conform thereto. Due to the fact that the frame is formed of a resilient material, the frame A is particularly well adapted to be retailed without holes 24 formed therein whereby the purchaser himself may do so by means of a knife or other punch means to conform to the holes in the plate on which it is to be mounted. It will be apparent that in this manner it is unnecessary for a manufacturer or retailer to maintain a large inventory of the frames, as the frames may be sold unpunched. However, if it is desired to have the holes 24 preformed in the frame before sale, this can be accomplished by a simple punching operation.

In use, the operation of the preferred form of the invention is extremely simple. The openings 24, if not already in the flanges 10b, 12b, 14b and 16b, are formed therein in proper positions to coincide with the bolt holes formed in the plate with which the invention is to be used. The frame A is then mounted on plate B by stretching the end pieces 10 and 12, as well as the cross pieces 14 and 16 sufficiently to allow them to be placed over the edge portions of plate B, and due to the resiliency of the material forming the frame, it will snugly engage the plate in the manner shown in Figure 3. After the license plate B has been placed within the space C of frame A, bolts or screws 26 are inserted through openings 24 and the openings (not shown) in the license plate, to hold the combined license plate frame A and license plate B at the desired position on the vehicle.

In the first alternate form D of the invention shown in Figure 6, an elongate rectangular frame D is provided that includes a continuous web 30 of such size and shape as to extend around the edges of license plate B. A continuous flange 32 extends inwardly from the rear edge portions of band 30. The forward portions of the band 30 (Figure 7) have a number of spaced fingers 34 formed thereon that extend inwardly toward one another. The first alternate form D of the invention is preferably formed of a material sufficiently resilient that the fingers 34 can be deformed to permit the license plate B to be disposed in the frame D. When positioned in frame D, plate B is held therein between the flange 32 and the fingers 34.

The first alternate form of the invention as above described is mounted on the license plate by temporarily deforming the fingers 34, which fingers possess sufficient resiliency to return to substantially their initial position upon removal of such deforming force therefrom. Because of its resiliency, frame D will remain in position on the license plate B until manually removed therefrom. License plate frame D serves the same function as the preferred form of the invention, but has the advantage of being slightly easier to install on the license plate.

A second alternate form of the invention is shown in Figure 8 that includes a rectangular frame 36 that is of such size as to permit the license plate B to fit within the confines thereof. Frame 36 has fingers 38 (Figures 8 and 9) that extend inwardly from the outer interior portions of the frame, and openings 40 are formed therein that are in alignment with the openings (not shown) provided in the license plate B on which this second alternate form of the invention is to be used. The second form of the invention differs from the two forms previously described in that this alternate form requires no stretching when being positioned on a license plate B. Accordingly, the second alternate form of the invention may be fabricated from either a rigid metallic material or one having resilient characteristics such as rubber or one of the numerous synthetic plastic materials available for this purpose.

A third alternate form of the invention is shown in Figure 10 and includes a rectangular frame 42 that is of such size and shape that the interior surface thereof abuts against the edges of the license plate B on which it is used. Two identical flanges 44 and 46 extend inwardly from the edges of the central portion of frame 42, which flanges are adapted to encase the outer edge portions of license plate B. Frame 42 is mounted on the license plate B by simply deforming the flange 46 to the position shown in Figure 11, and thereafter snapping it into place on the license plate. Should it be desired, the flange 44 can also be deformed for mounting in the same manner as flange 46. This form of the invention is only adapted for fabrication from such resilient materials as rubber, synthetic plastics, or the like. The invention is used in the same manner as those forms previously described in detail.

A fourth alternate form of the invention is shown in Figure 12 that also includes a rectangular frame 50 extending around the edge portion of a license plate B. This frame embodies a rearwardly disposed, continuously extending flange 52 and a forwardly positioned continuous lip 54 from which spaced fingers 56 project downwardly in the same manner as the fingers 38 shown in Figure 8. Openings 58 are provided in fingers 56, which openings are in alignment with the openings (not shown) formed in the license plate B on which the invention will be used. This form of the invention is used in the same manner as those previously described.

A fifth alternate form is shown in Figure 14 that is also generally rectangular and includes a frame 60 that is adapted to extend around the edge portions of a license plate B. However, this frame is divided on either the top or bottom cross piece into two separate sections 60a and 60b, the end portions of which abut against one another as shown in Figure 15. The cross piece portions 60a and 60b have lugs 62 and 64 projecting from the adjacent exterior end portions thereof, and these lugs have oppositely disposed inwardly tapering external surfaces 62a and 64a, respectively. A resilient clip 66 is provided that includes a web 68 and two legs 70 and 72 which are adapted to resiliently grip the exterior tapered surfaces of lugs 62 and 64 to securely hold the frame 60 in position on a license plate frame B. Inadvertent displacement of clip 66 from the license plate is prevented by the free end portions of legs 70 and 72 which are disposed between two horizontal vertically spaced ribs 74 and 76 formed in the external surfaces of the frame portions 60a and 60b. Inasmuch as it only has to be slightly deformed to place it in an encircling position on a license plate B, this fifth form of the invention can be fabricated from either a metallic material of some resiliency, or from a resilient material such as rubber or one of the numerous synthetic plastic materials available for such purposes. This alternate form of the device is also used in the same manner as the forms above described.

Although the preferred and alternate forms of the invention are susceptible to fabrication from a variety of materials, in practice it has been found desirable to fabricate the first and second alternate forms from a butyrate type of resinous material. The third and fourth alternate forms of the invention are adapted to be fabricated from either a vinyl resin or resilient rubber.

The use and operation of the inventions above described have been previously set forth in detail and need not be repeated herein.

Although the forms of the invention herein shown and described are fully capable of achieving the objects and providing the advantages hereinbefore mentioned, it is to be understood that they are merely illustrative of the presently preferred embodiment thereof and that we do not mean to limit ourselves to the details of construction herein shown and described other than as defined in the appended claims.

We claim:
1. A substantially rectangular one-piece frame for an auto license plate, the frame including two vertical end pieces, a top cross member and a bottom cross member, said end pieces and cross members being integrally connected in end-to-end relation to each other, and each including a web normally and adjacently positioned to one of the edges of said plate to be disposed within said frame, with each of said webs having a flange and a lip that extend inwardly from the longitudinal edges thereof over an edge portion of said license plate to prevent inadvertent displacement of said plate from said frame, one of said end pieces or cross members being divided to provide two sections having free end portions that are adjacently disposed when said frame is mounted on said plate, with said frame being formed of a material that permits deformation of the frame to the extent that it can be mounted on said plate; two lugs mounted on and projecting rearwardly from said end portions; and fastening means that slidably and removably engage said lugs to hold said frame in an encircling position on said plate.

2. A substantially rectangular one-piece frame for an auto license plate as defined in claim 1 wherein said fastening means is a resilient clip.

3. A substantially rectangular one-piece frame for an auto license plate as defined in claim 2 wherein means are provided to prevent said clip from inadvertently sliding out of said engagement therewith.

4. A substantially rectangular one-piece frame for an auto license plate as defined in claim 3 wherein said means to prevent said clip from inadvertently sliding from said lugs are two parallel, spaced ribs formed on each of said sections adjacent the lug mounted on said section, with each of said two spaced ribs being adapted to have a portion of said clip disposed therebetween.

5. A substantially rectangular one-piece frame for an auto license plate as defined in claim 4 wherein said lugs are formed with oppositely disposed faces that taper toward one another and toward said frame, and said clip is defined by a web from the ends of which two legs extend that taper toward one another and are adapted to removably engage said tapered faces.

6. A substantially rectangular one-piece frame for an auto license plate as defined in claim 5 wherein said frame and lugs are formed as an integral unit from a resilient material.

References Cited in the file of this patent
UNITED STATES PATENTS

| | | |
|---|---|---|
| D. 164,008 | Loyd | July 24, 1951 |
| 1,738,273 | Anderson | Dec. 3, 1929 |
| 1,752,883 | Busenbark | Apr. 1, 1930 |
| 1,877,075 | Stephenson | Sept. 13, 1932 |
| 2,082,434 | White | June 1, 1937 |
| 2,160,960 | Dinstbir | June 6, 1939 |
| 2,190,571 | Salducco | Feb. 13, 1940 |
| 2,499,747 | Griffith | Mar. 7, 1950 |